US009378550B2

(12) United States Patent
Twellmann et al.

(10) Patent No.: US 9,378,550 B2
(45) Date of Patent: Jun. 28, 2016

(54) IMAGE PROCESSING DEVICE FOR FINDING CORRESPONDING REGIONS IN TWO IMAGE DATA SETS OF AN OBJECT

(75) Inventors: Thorsten Twellmann, Bremen (DE); Horst Hahn, Bremen (DE); Fabian Zohrer, Bremen (DE); Konstantinos Filippatos, Bremen (DE)

(73) Assignees: Mevis Medical Solutions AG, Bremen (DE); Fraunhofer Gesellschaft zur Förderung der Angewandten Forschung e.V., Bremen (DE)

( * ) Notice: Subject to any disclaimer, the term of this patent is extended or adjusted under 35 U.S.C. 154(b) by 171 days.

(21) Appl. No.: 14/002,336

(22) PCT Filed: Mar. 2, 2011

(86) PCT No.: PCT/EP2011/053134
§ 371 (c)(1),
(2), (4) Date: Oct. 29, 2013

(87) PCT Pub. No.: WO2012/116746
PCT Pub. Date: Sep. 7, 2012

(65) Prior Publication Data
US 2014/0056502 A1    Feb. 27, 2014

(51) Int. Cl.
*G06K 9/00* (2006.01)
*G06T 7/00* (2006.01)

(52) U.S. Cl.
CPC ............. *G06T 7/0014* (2013.01); *G06T 7/0012* (2013.01); *G06T 7/0028* (2013.01); *G06T 2207/10072* (2013.01); *G06T 2207/10104* (2013.01); *G06T 2207/10108* (2013.01);

(Continued)

(58) Field of Classification Search
None
See application file for complete search history.

(56) References Cited

U.S. PATENT DOCUMENTS

| 6,553,356 | B1 * | 4/2003 | Good | G06F 19/321 |
| | | | | 382/156 |
| 7,490,988 | B1 * | 2/2009 | Yan | A61B 6/50 |
| | | | | 378/207 |
| 7,865,002 | B2 * | 1/2011 | Basilico | G06T 7/0012 |
| | | | | 378/37 |

(Continued)

FOREIGN PATENT DOCUMENTS

| WO | 2008151113 A1 | 12/2008 |
| WO | 2011007312 A1 | 1/2011 |

OTHER PUBLICATIONS

Ipsilateral mammogram—Sun et al—Computerized Medical Imaging and Graphics 28 (2004) 151-158.*

(Continued)

*Primary Examiner* — Chan Park
*Assistant Examiner* — Iman K Kholdebarin
(74) *Attorney, Agent, or Firm* — Ellen M. Bierman; Lowe Graham Jones PLLC

(57) ABSTRACT

The invention relates to an image processing device (1) for finding corresponding first and second regions in two image data sets of an object. In a first image data set a source line and in a second image data set a corresponding target line are determined depending on reference regions detectable in both image data sets. A first region in the first image data set is projected onto the source line, thereby dividing the source line into two source sub-lines and defining a source ratio as the ratio of the length of one of the source sub-lines to the length of the entire source line. A second region in the second image data set is then determined such that a projection of the second region onto the target line leads to a corresponding target ratio which is similar to the source ratio.

19 Claims, 7 Drawing Sheets

(52) U.S. Cl.
CPC ............... *G06T2207/10132* (2013.01); *G06T 2207/20068* (2013.01); *G06T 2207/30068* (2013.01)

(56) References Cited

U.S. PATENT DOCUMENTS

| | | | | |
|---|---|---|---|---|
| 2007/0280525 | A1* | 12/2007 | Basilico | G06T 7/0012 382/132 |
| 2008/0292164 | A1* | 11/2008 | Azar | A61B 5/0091 382/131 |
| 2012/0114213 | A1* | 5/2012 | Buelow | G06T 7/0032 382/131 |

OTHER PUBLICATIONS

European Patent Office; International Search Report and Written Opinion for PCT/EP2011/053134; Completed May 31, 2011; Mailed Jun. 14, 2011; 14 pages.

Yuan-Hsiang Chang, Phd., et al.; Computerized Localization of Breast Lesions From Two Views an Experimental Comparison of Two Methods; Investigative Radiology, Sep. 1999; vol. 34; No. 9; pp. 585-588; 4 pages.

Xuejun Sun et al.; Ipsilateral Multi-view CAD System for Mass Detection in Digital Mammography; Mathematical Methods in Biomedical Image Analysis, Dec. 9, 2001; pp. 19-26; 8 pages.

\* cited by examiner

IMAGE PROCESSING DEVICE FOR FINDING CORRESPONDING REGIONS IN TWO IMAGE DATA SETS OF AN OBJECT

FIELD OF THE INVENTION

The invention relates to an image processing device, image processing method and image processing computer program for finding corresponding regions in two image data sets of an object.

BACKGROUND OF THE INVENTION

Breast cancer detection and diagnosis benefit significantly from multi-modal imaging. Mammography (MG) is the first line modality for population screening. For surveillance of women which are known to have an increased risk of developing breast cancer, e.g. due to a family history of cancer or genetic predisposition, additional modalities such as contrast-enhanced magnetic resonance imaging (MRI) are utilized and have been widely integrated into regular healthcare provision programs. Both modalities provide complementary diagnostic information. Several signs of breast cancer like micro calcifications can be identified in MG images but barely in MRI. Other tumors can be detected in mammograms, but the full spatial extent of the tissue disorder is only apparent in the contrast-enhanced MRI images. On the other hand some cancers show-up in MRI, but expose none or only subtle manifestations in MG. Also assessment of the likelihood of malignancy of tumors benefits from multi-modal imaging approaches. For instance, co-localization of micro calcification in MG with tissue angiogenesis as depicted by MRI substantiates positive assessment of tumors. In summary, it is essential to combine the complementary information for detection and assessment of findings which is the basis for clinical decision making and eventual treatment.

The visual appearance of a finding in different modalities is usually highly variable and to a certain extent unpredictable due to the individual tissue physiology, but also because of the different technical principals of each imaging technique. In mammography two-dimensional projection images are acquired from e.g. a cranio-caudal (CC) and mediolateral-oblique (MLO) perspective with the patient in a standing position and the breast significantly compressed to emphasize certain tissue patterns. The image intensity mainly correlates with the radio-opacity of the tissue. In MRI the patient is placed in a prone position on the scanner table, the breast is gently compressed for the purpose of reducing motion artifacts and a contrast agent is administered to improve the contrast in the acquired three-dimensional images. Image intensities in contrast-enhanced MRI correlate in the first instance with the local concentration of contrast agent and protons.

Due to the different nature of the images acquired with different modalities and the physiological variability of tissue, the spatial correlation of different modalities becomes a difficult and time-consuming task even for well trained experts. If a finding has been identified in one modality, but is not immediately apparent in a second modality, the reader has to orient himself by means of anatomical landmarks which are visible in both modalities. The nipple, pectoral muscle, skin surface, major blood vessels or components of the glandular disc may serve as landmarks and help radiologist in finding an approximate corresponding position in a second modality where he/she can perform a local search for additional subtle signs of a tissue disorders. In either situation, the reader has to develop a mental model that takes into account the underlying technical principals of each modality in order to translate positions of findings from one modality to the other modality. Furthermore, a certain level of interaction with the image data is required, e.g. for selecting a correct image slice or changing the orientations of a reformation plane if the modality provides a three-dimensional image volume which is displayed as a two-dimensional image.

Computer tools which support the reader in finding corresponding regions in mammography and MRI images of the same breast promise to improve this workflow in terms of speed and confidence. The article "An intensity-based approach to X-ray mammography—MRI registration" by Mertzanidou et al., Proc. SPIE Medical Imaging: Image Processing, 7623-106, 2010, describes an approach for translating positions in MRI to approximate positions in a CC mammogram of the sane breast. Central component is a finite element model (FEM) of the biomechanics of the breast. Using a FEM that is adapted to the individual patient using a segmentation of the breast in the MRI image, the same compression force applied in mammography is applied in a simulation to the MRI image. Subsequently, MRI intensities are mapped to X-ray attenuation values and a two-dimensional projection image is simulated from the deformed MRI dataset. The simulated X-ray mammogram resembles the real mammogram and can therefore be aligned with the latter using conventional intensity-based image registration algorithms. This last step completes the processing pipeline which allows for translating three-dimensional positions in MRI to the corresponding two-dimensional position in CC mammograms. In the opposite direction, a two-dimensional position in the CC mammogram can only be translated into a line in the MRI due to the missing depth information in the X-ray projection image. This rather sophisticated approach has the disadvantage that FEM are computational very demanding and require reasonable approximations of the biomechanical properties of breast tissue. Additionally, the method requires a detailed segmentation not only of the pectoral muscle and skin surface but also of the fatty and glandular tissue within the breast for the purpose of estimating reasonable X-ray attenuation values from MRI intensities.

The articles "Fusion of contrast-enhanced breast MR and mammographic imaging data" by C. P Behrenbruch et al., The British Journal of Radiology, 77 (2004), S201-S208; "MRI—Mammography 2D/3D Data Fusion for Breast Pathology Assessment" by C. P Behrenbruch et al., Proceedings of MICCAI 2010 and "Fusion of contrast-enhanced breast MR and mammographic imaging Data" by C. P Behrenbruch et al., Medical Image Analysis 7 (2003) 311-340 utilize a combination of pharmacokinetic modeling, projection geometry, wavelet-based landmark detection and thinplate spline non-rigid registration to transform the coordinates of regions of interest (ROIs) from two-dimensional mammograms to the spatial reference frame of contrast-enhanced MRI volumes.

The article "Two-dimensional three-dimensional correspondence in mammography" by R Marti et al., Cybernetics and Systems, Volume 35, Number 1, January-February 2004, pp. 85-105(21) also simulates X-ray projection images from the MRI data that resemble the original MLO and CC mammograms. The MR-based projection images are further deformed using rigid intensity-based registration followed-by a matching of local salient points from linear structures as well as anatomical boundaries of the MR-based projection images with the true original mammograms.

SUMMARY OF THE INVENTION

It is an object of the present invention to provide an image processing device for finding corresponding regions in two image data sets, wherein corresponding regions can be found with relatively low computational efforts.

In a first aspect of the present invention an image processing device for finding corresponding regions in two image data sets of an object is presented, wherein the image processing device comprises:
- an image providing unit for providing a first image data set of the object and a second image data set of the same object,
- a first region determination unit for determining a first region in the first image data set,
- a second region determination unit for determining a second region, which corresponds to the first region in the first image data set, in the second image data set, the second region determination unit being adapted to:
  - determine a source line in the first image data set depending on reference regions detectable in the first image data set and in the second image data set,
  - project the first region onto the source line in the first image data set, thereby dividing the source line into two source sub-lines,
  - determine a source ratio as the ratio of the length of one of the source sub-lines to the length of the entire source line,
  - determine a target line, which corresponds to the source line, in the second image data set depending on the reference regions detectable in the first image data set and in the second image data set,
  - determine the second region in the second image data set such that a projection of the second region onto the target line divides the target line into two target sub-lines such that the ratio of the length of one of the target sub-lines to the entire length of the target line is similar to the source ratio.

Since the second region is determined by using simple computational operations like projecting, calculating and comparing of ratios, corresponding regions can be determined in the first and second image data sets with relatively low computational efforts.

The projection is preferentially an orthogonal projection. If the region is already located on the respective line, the location of the region on the line is the location of its projection.

The object is preferentially a breast.

The image data sets can be acquired by the same imaging modality or by different imaging modalities. Possible imaging modalities are, for example, MR, computed tomography (CT), position emission tomography (PET), single photon emission computed tomography (SPECT), MG, ultrasound (US), tomosynthesis et cetera modalities.

The image providing unit can be a storage unit, in which the image data sets are stored already, and/or a receiving unit for receiving image data sets via a wireless or wired data connection and for providing the received image data sets for processing the same. The image providing unit can also be an image generation apparatus for generating the image data sets like the above mentioned imaging modalities.

The first region determination unit can comprise a user interface allowing a user to determine the first region in the first image data set. For example, the first region determination unit can comprise a graphical user interface which allows the user together with a mouse, keyboard, touch screen or another input device to select the first region in the first image data set.

In an embodiment, the first region determination unit can be adapted to provide a marker from, for example, a computer-aided detection (CAD) algorithm or from a structured report generated by another user for determining a marker defining the first region in the first image. In particular, the several markers can be provided, which are shown in the first image, and the first region determination unit can be adapted to allow a user to select one of these markers as the first region.

The second region determination unit can be adapted to determine a multitude of source lines and a multitude of corresponding target lines, wherein the multitude of source lines and the multitude of target lines are determined depending on reference regions detectable in the first image data set and the second image data set. The second region determination unit can then be adapted to determine the second region such that one or several projections of the second region on one or several target lines of the multitude of target lines divide the one or several target lines into sub-lines, wherein the ratio of a length of a sub-line of a respective target line to a length of the entire respective target line is similar to one or several source ratios of corresponding one or several source lines.

In an embodiment, the first and second image data sets comprise three-dimensional images. In another embodiment, one of the first image data set and the second image data set comprises a three-dimensional image and the other of the first image data set and the second image data set comprises at least two two-dimensional images. Preferentially, the at least two two-dimensional images are projection images, which correspond to different projection directions.

It is preferred that the second region determination unit is adapted to determine corresponding source lines and source ratios in the at least two two-dimensional images, and average the corresponding source ratios for generating at least one average source ratio for being used for determining the second region. For example, corresponding source lines in the at least two two-dimensional images can be lines connecting the pectoral line or pectoral surface of a breast with a frontal breast position like the nipple position. Source ratios can be determined for each of these lines and averaged for determining an average source ratio which can be used for determining a second region such that a projection of the second region onto a corresponding target line divides the target line into two target sub-lines such that the ratio of the length of one of the target sub-lines to the entire length of the target line is similar to the averaged source ratio. This can improve the quality of determining the second region.

Preferentially, the projection images are images of a breast; in particular, the projection images are two of the commonly acquired CC mammography image, mediolateral (ML) mammography image and MLO mammography image. In the projection images the breast is preferentially shown with different compressions, in particular with different compression directions, wherein the breast is compressed between two parallel plates. In the three-dimensional image the breast is preferentially not or only slightly compressed.

In a preferred embodiment, the second region determination unit is adapted to determine the source line depending on the reference regions and the first region in the first image. For example, a first source line can be determined based on a frontal breast position like the nipple position and a pectoral line or surface, which are determinable from the first image data set and the second image data set. The first source line can, for example, be defined as a line connecting the pectoral line or the pectoral surface with the frontal breast position, i.e., in this example, the first source line can be determined from reference regions only. A second source line can be determined depending on the first source line and, thus, depending on the reference regions, and depending on the first region. For example, a second source line can be defined such that it is perpendicular to and starts at the first source, traverses the first region and ends at a skin surface of the breast, wherein the skin surface can be regarded as being a reference region.

It is preferred that the object is a breast and the reference regions are the pectoral line or pectoral surface, the skin line or skin surface of the breast and the frontal breast position defined by one of the following options i) the nipple position, ii) the cutting point of the skin line or skin surface and the line that is perpendicular to the pectoral line or pectoral surface and crosses the center of mass of the breast, and iii) the point on the skin line or skin surface having the largest perpendicular distance to the pectoral line or pectoral surface. If an image data set comprises a two-dimensional image, reference regions in the two-dimensional image are preferentially a pectoral line and a skin line. If an image data set comprises a three-dimensional image, reference regions in the three-dimensional image are preferentially a pectoral surface and a skin surface.

It is preferred that the source line and the target line are determined as a line connecting the pectoral line or the pectoral surface with the frontal breast position. It is further preferred that the source line and the target line are perpendicular to the pectoral line. In a CC image a border of the image is preferentially regarded as being the pectoral line, i.e. as being a reference region.

The second region determination unit can determine several source and target lines, wherein preferentially at least one source line and one target line are determined as a line connecting the pectoral line or the pectoral surface with the frontal breast position.

In a preferred embodiment, at least one of the first image data set and the second image data set comprises a three-dimensional image, wherein at least one of the source line and the target line in the three-dimensional image is defined by one of the following options i) the intersecting line of the sagittal and axial body plane that meet the frontal breast position, and ii) the shortest line connecting the pectoral surface and the frontal breast position, wherein the line is located in the sagittal body plane that meets the frontal breast position.

For the sake of simplicity of the following description and without loss of generality it is assumed that in three-dimensional images the x-axis is orthogonal to the sagittal body plane, the y-axis is orthogonal to the coronal body plane and the z-axis is orthogonal to the axial plane.

It is preferred that the second region determination unit is adapted to:
  determine for different dimensions of the first region different linear independent source lines depending on the reference regions,
  project the first region onto the different source lines, thereby dividing each source line into two source sub-lines,
  determine different source ratios of the length of one of the respective source sub-lines to the length of the entire respective source line for each source line,
  determine different target lines, which correspond to the different source lines, in the second image data set depending on the reference regions detectable in the first image data set and in the second image data set,
  determine the second region in the second image data set such that for each target line a projection of the second region onto the respective target line divides the respective target line into two respective target sub-lines such that the ratio of the length of one of the respective target sub-lines to the entire length of the respective target line is similar to the respective source ratio.

It is also preferred that at least one source line is determined depending on the reference regions and the first region and wherein at least one corresponding target line is determined depending on the reference regions and a source ratio.

In a further preferred embodiment, the object is a breast, wherein the reference regions are the frontal breast position, the pectoral line or pectoral surface and the skin line or skin surface of the breast, wherein a first source line connects the frontal breast position and the pectoral line or surface in the first image data set, wherein a second source line is perpendicular to the first source line, traverses the first region and ends at the skin surface of the breast in the first image data set, wherein a first target line, which corresponds to the first source line, connects the frontal breast position and the pectoral line or pectoral surface in the second image data set, and wherein a second target line, which corresponds to the second source line, is perpendicular to the first target line and divides the first target line into two target sub-regions such that the ratio of the length of one of the target sub-regions of the first target line to the length of the entire first target line is similar to the source ratio of the first source line.

It is also preferred that the first image data set comprises a first two-dimensional projection image of a breast being a CC image and a second two-dimensional projection image of the breast being an MLO image or an ML image, wherein the second image data set comprises a three-dimensional image of the breast and wherein the second region determination unit is adapted to:
  determine a y-coordinate of the second region in the three-dimensional image, wherein the y-axis of the orthogonal coordinate system of the three-dimensional image is orthogonal to the coronal body plane, depending on a first source ratio being determined by:
    determining a first source line in the second two-dimensional projection image, which is perpendicular to the pectoral line and connects the pectoral line with the frontal breast position,
    projecting the first region onto the first source line in the second two-dimensional projection image, thereby dividing the first source line into two first source sub-lines,
    determining the first source ratio as the ratio of the length of one of the first source sub-lines to the length of the entire first source line,
  determine an x-coordinate of the second region in the three-dimensional image, wherein the x-axis of the orthogonal coordinate system of the three-dimensional image is orthogonal to the sagittal body plane, depending on a second source ratio being determined by:
    determining a second source line in the first two-dimensional projection image, which
      a) is perpendicular to and starts at a line, which is perpendicular to the pectoral line in the first two-dimensional projection image and connects the pectoral line with the frontal breast position,
      b) intersects the first region, and
      c) ends at the skin surface of the breast,
    determining the second source ratio as the ratio of the length of one of the second source sub-lines, in which the second source line is divided by the first region, to the length of the entire second source line,
  determine a z-coordinate of the second region in the three-dimensional image, wherein the z-axis of the orthogonal coordinate system of the three-dimensional image is orthogonal to the axial body plane, depending on a third source ratio being determined by:
    determining a third source line in the second two-dimensional projection image, which is perpendicular to the first source line, intersects the first region and ends at the skin surface of the breast,
    determining the third source ratio as the ratio of the length of one of the third source sub-lines, in which the third source line is divided by the first region, to the length of the entire third source line.

The second region determination unit can be adapted to approximate the third source ratio as the ratio of the length of one of the third source sub-lines, in which the third source line is divided by the first region, to the length of the entire third source line.

It is further preferred that the first image data set comprises a three-dimensional image of a breast and the second image data set comprises a first two-dimensional projection image of the breast being a CC image and a second two-dimensional projection image of the breast being an MLO image or an ML image of the breast, wherein the second region determination unit is adapted to:
    determine a y-coordinate of the second region in the first two-dimensional projection image, wherein the y-axis of the orthogonal coordinate system of the first two-dimensional projection image is orthogonal to the sagittal body plane, depending on a first source ratio being determined by:
        determining a first source line in the three-dimensional image, which
            a) starts at a line, which is the projection of the line connecting the pectoral surface with the frontal breast position into the axial plane that meets the frontal breast position in the three-dimensional image,
            b) coincides with the intersection line of the axial plane that meets the frontal breast position and the coronal plane that contains the first region in the three-dimensional image, and
            c) ends at the skin surface of the breast,
        projecting the first region onto the first source line in the three-dimensional image, thereby dividing the first source line into two first source sub-lines,
        determining the first source ratio as the ratio of the length of one of the first source sub-lines to the length of the entire first source line,
    determine a x-coordinate of the second region in the first two-dimensional projection image and in the second two-dimensional projection image, wherein the x-axes of the orthogonal coordinate systems of the first two-dimensional projection image and the second two-dimensional projection image are orthogonal to the coronal body plane, depending on a second source ratio being determined by:
        determining a second source line in the three-dimensional image, which connects the pectoral surface with the frontal breast position,
        determining the second source ratio as the ratio of the length of one of the second source sub-lines, in which the second source line is divided by the coronal plane, which contains the first region, to the length of the entire second source line,
    determine a y-coordinate of the second region in the second two-dimensional projection image, wherein the y-axis of the orthogonal coordinate system of the second two-dimensional projection image is orthogonal to the x-axis in the same image which is orthogonal to the coronal body plane, depending on a third source ratio being determined by:
        determining a third source line in the three-dimensional image, which
            a) starts at a line, which connects the pectoral surface with the frontal breast position in the three-dimensional image,
            b) coincides with the intersection line of the coronal plane that contains the first region and the plane that meets the frontal breast position and has the same orientation as the projection plane of the MLO or ML in the three-dimensional image, and
            c) ends at the skin surface of the breast,
        projecting the first region onto the third source line in the three-dimensional image, thereby dividing the third source line into two first source sub-lines,
        determining the third source ratio as the ratio of the length of one of the third source sub-lines to the length of the entire third source line.

It is also preferred that at least one of the first image data set and the second image data set comprises a projection image, wherein at least one source ratio is corrected for a projection error. The correction for the projection error allows improving the quality of determining corresponding regions in the first and second image data sets.

It is further preferred that the image processing device comprises a display for displaying the first region in the first image data set and the second region in the second image data set. Preferentially, the image processing device further comprises a tool providing unit for providing a tool for being used in the first image data set and in the second image data set, wherein the display is adapted to show the tool at the first region in the first image data set and at the second region in the second image data set. This allows using the tool in both image data sets at corresponding positions. The tool is, for example, a local digital magnifier, a cross hair, a peak-hole view, et cetera.

It is further preferred that the image processing device comprises an uncertainty determination unit for determining an uncertainty of determining the second region in the second image data set, wherein the display is adapted to indicate the uncertainty in the second image. For example, a margin can be displayed around the second region, wherein the size of the margin depends on the determined uncertainty.

In a preferred embodiment, the image processing device comprises a finding providing unit for providing findings in the first image data set and the second image data set, wherein the first region determination unit is adapted to determine the region of a first finding in the first image data set as the first region, wherein the image processing device further comprises a grouping unit for grouping the first finding and a second finding in the second image data set into a group of findings, if the distance between the position of the second finding in the second image data set and the position of the second region is smaller than a predefined threshold. It is also preferred that the image processing device comprises a group classification unit for classifying a group of findings based on features of the findings of the group and on predefined group classification rules.

In a further aspect of the present invention an image processing method for finding corresponding regions in two image data sets of an object is presented, wherein the image processing method comprises:
    providing a first image data set of the object and a second image data set of the same object by an image providing unit, determining a first region in the first image data set by a first region determination unit, determining a second region, which corresponds to the first region in the first image data set, in the second image data set by a second region determination unit, wherein the determination includes:

determining a source line in the first image data set depending on reference regions detectable in the first image data set and in the second image data set, projecting the first region onto the source line in the first image data set, thereby dividing the source line into two source sub-lines, determining a source ratio as the ratio of the length of one of the source sub-lines to the length of the entire source line, determining a target line, which corresponds to the source line, in the second image data set depending on the reference regions detectable in the first image data set and in the second image data set, determining the second region in the second image data set such that a projection of the second region onto the target line divides the target line into two target sub-lines such that the ratio of the length of one of the target sub-lines to the entire length of the target line is similar to the source ratio.

In a further aspect of the present invention an image processing computer program for finding corresponding regions in two image data sets of an object is presented, wherein the computer program comprises program code means for causing an image processing apparatus as defined in the claims to carry out the steps of the image processing apparatus as defined in the claims, when the image processing computer program is run on a computer controlling the image processing apparatus.

It shall be understood that the image processing device, the image processing method, and the image processing computer program of the independent claims have similar and/or identical preferred embodiments as defined in the dependent claims.

It shall be understood that a preferred embodiment of the invention can also be any combination of the dependent claims with the respective independent claim.

DETAILED DESCRIPTION OF PREFERRED EMBODIMENTS

Figure 1:
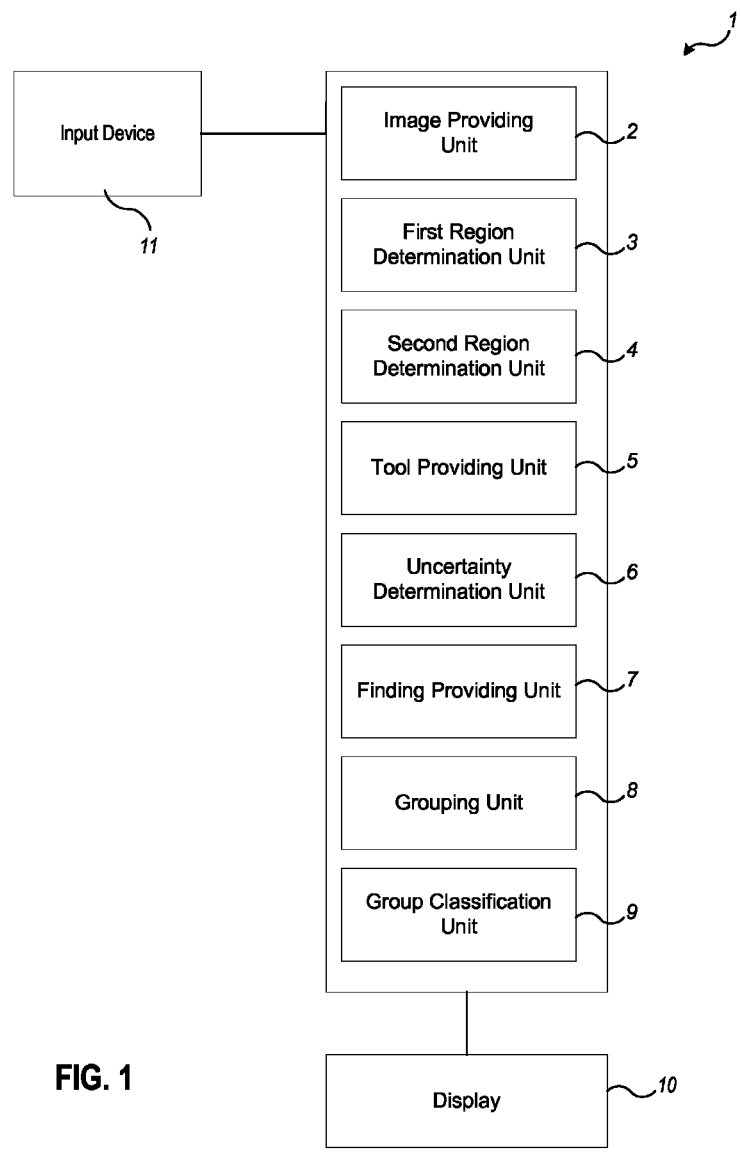
FIG. 1 shows schematically and exemplarily an embodiment of an image processing device for finding corresponding regions in two image data sets of an object.

FIG. 1 shows schematically and exemplarily an embodiment of an image processing device for finding corresponding regions in two image data sets of an object. The image processing device 1 comprises an image providing unit 2 for providing a first image data set of the object and a second image data set of the same object. In this embodiment, the object is a breast, and one of the first image data set and the second image data set comprises a three-dimensional MR image of the breast and the other of the first image data set and the second image data set comprises a CC mammography image and an MLO mammography image of the breast. The CC mammography image and the MLO mammography image are projection images with different projection directions, wherein the breast is compressed in the respective projection direction between two parallel plates. In other embodiments, instead of the MLO mammography image an ML mammography image can be provided. In general, the first image data set and the second image data set can also comprise other images. For example, both, the first and the second image data sets, can comprise three-dimensional images. Moreover, instead of a three-dimensional MR image the first image data set and/or the second image data set can also comprise another three-dimensional image like a CT image, a PET image, a SPECT image, a US image or a tomosynthesis image.

The image providing unit 2 can be a storage unit, in which the image data sets are stored already and/or a receiving unit for receiving image data sets via a wireless or wired data connection and for providing the received image data sets for processing the same. The image providing unit can also be an image generation apparatus for generating the image data sets like a MR apparatus, a CT apparatus, a PET apparatus, a SPECT apparatus, a MG apparatus, an US apparatus, or a tomosynthesis apparatus.

The image processing device 1 further comprises a first region determination unit 3 for determining a first region in the first image data set. The first region determination unit 3 can comprise a graphical user interface for allowing a user together with an input unit 11 like a mouse, keyboard, touch-screen, et cetera to select the first region in the first image data set. However, the first region determination unit 3 can also be adapted to provide a marker obtained from, for example, a CAD algorithm or from a structured report generated by another user for determining a marker defining the first region in the first image. In particular, several markers can be provided by, for example, the CAD algorithm or a structured report generated by another user, which are shown in the first image data set, wherein the first region determination unit can be adapted to allow a user to select one of these markers as the first region.

The image processing device 1 further comprises a second region determination unit 4 for determining a second region, which corresponds to the first region in the first image data set, in the second image data set. The second region determination unit 4 is adapted to determine a source line in the first image data set depending on reference regions detectable in the first image data set and in the second image data set. The first region is projected onto the source line in the first image data set, thereby dividing the source line into two source sub-lines. A source ratio is determined as the ratio of the length of one of the source sub-lines to the length of the entire source line. A target line is determined, which corresponds to the source line, in the second image data set depending on the reference regions detectable in the first image data set and in the second image data set. The second region in the second image data set is then determined such that a projection of the second region onto the target line divides the target line into two target sub-lines, such that the ratio of the length of one of the target sub-lines to the entire length of the target line is similar to the source ratio. For determining the ratio with respect to the target line and the source ratio, the lengths of the target sub-line and source sub-line, respectively, are used, which correspond to each other. The projection onto the respective line is preferentially an orthogonal projection. If the respective region is already located on the respective line, the location of the region on the line is the location of its projection.

Since, in this embodiment, one of the first image data set and the second image data set comprises a three-dimensional MR image and the other of the first image data set and the second image data set comprises a CC mammography image and an MLO mammography image, the second region determination unit is adapted to determine a second region in the CC mammography image and the MLO mammography image, which corresponds to a first region provided in the MR image, and to determine a second region in the MR image, which corresponds to a first region provided in the CC mammography image and the MLO mammography image.

In the following coordinate transformations for an arbitrary point A, i.e. for a first region, in one or more image specific coordinate systems of the first image data set to a target coordinate system in the second image data set are described, which can be performed by the second region determination unit for determining a second region in the second image data set, which corresponds to the first region. These transformations are preferentially achieved by measuring distances between A and anatomical landmarks, i.e. reference regions, which are depicted in all images. The reference regions are preferentially the pectoral line or pectoral surface, i.e. the pectoral contour, the skin line or skin surface of the breast and the frontal breast position defined by one of the following options: i) the nipple position, ii) the cutting point of the skin line or skin surface and the line that is perpendicular to the pectoral line or pectoral surface and crosses the center of mass of the breast, and iii) the point on the skin line or skin surface having the largest perpendicular distance to the pectoral line or pectoral surface. In the two-dimensional CC and MLO mammography images the pectoral contour and the skin are lines, and in the three-dimensional MR image they are surfaces. In particular, in the CC image the pectoral line is detected by detecting the border of the CC image.

Since the varying breast compression affects the measured distance values, each distance may be normalized to the length of a line between two landmarks on which point A is located.

More formally speaking, for MG to MR mapping, a function $f$ is preferentially derived that maps a corresponding pair of points $A^{CC}$ and $A^{MLO}$ from the CC and the MLO mammography image, respectively, to the corresponding position $A^{MR}$ in the MR image $$A^{MR} = f_{MR}(A^{CC}, A^{MLO}, d^{(MLO,CC,MR)}) \quad (1)$$

where $d^{(MLO,CC,MR)}$ can be normalized distances between anatomical structures which can be identified in all images.

For MR to MG mapping, a function $f$ is derived that maps a point $A^{MR}$ from the MR image to its corresponding positions $A^{CC}$ and $A^{MLO}$ in the CC and MLO mammography image, respectively $$A^{CC} = f_{CC}(A^{MR}, d^{(MLO,CC,MR)})$$

$$A^{MLO} = f_{MLO}(A^{MR}, d^{(MLO,CC,MR)}) \quad (2)$$

For the MG to MR mapping, the position of the arbitrary point A is expressed relative to anatomical structures and their corresponding distances in the used images. These anatomical structures are preferentially the frontal breast position N, in particular, the nipple position, the defined point P on the pectoral muscle, the orthogonal projection $A_p$ of A onto the nipple-pectoral line being a first source line and a corresponding target line, respectively, and S, the projection of A onto the skin surface in each image (FIGS. 3 to 6). The MG to MR mapping method describes how a three-dimensional point coordinate $A^{MR}$ in the MR image can be obtained from its corresponding two-dimensional representations $A^{CC}$ and $A^{MLO}$ in the CC and the MLO image, respectively.

Figure 2:
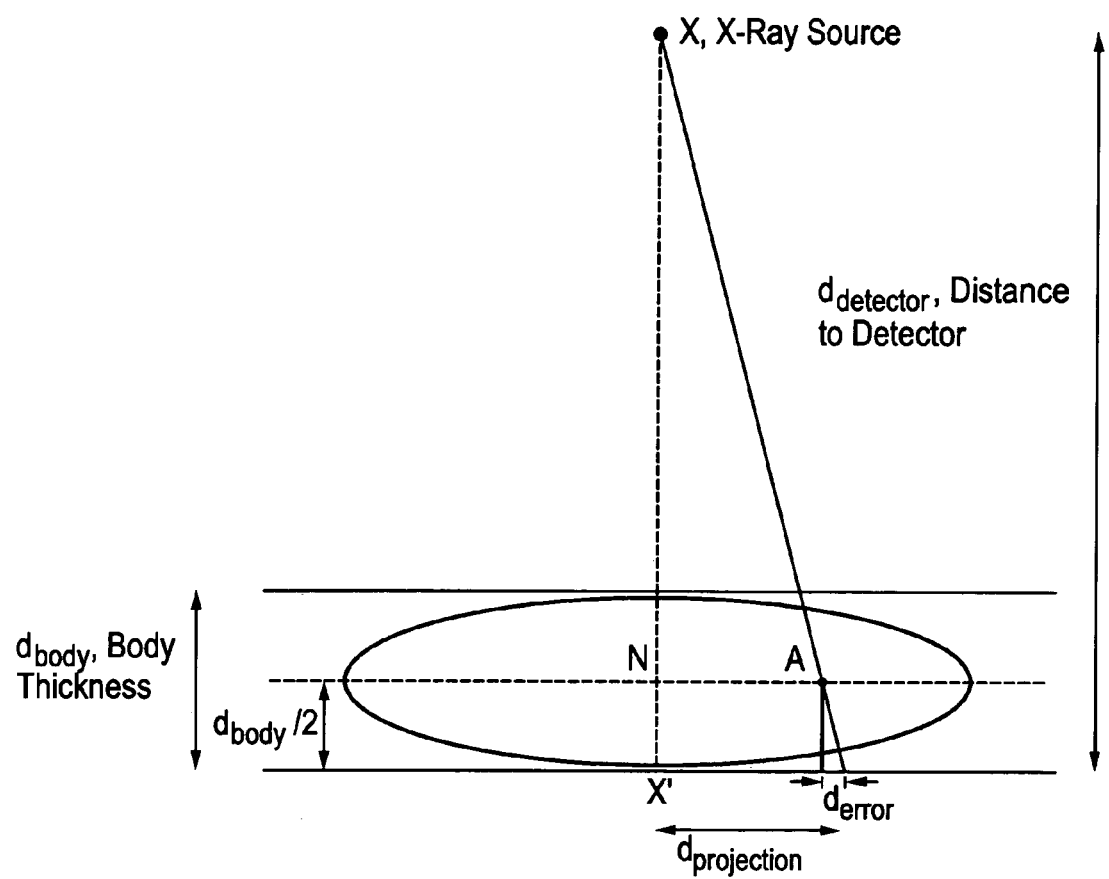
FIG. 2 shows schematically and exemplarily a model of a perspective projection in mammography.

The image formation process during mammography is described by a perspective projection of the compressed three-dimensional breast onto the image plane of the detector. For this reason, areas on the mammogram appear with an offset $d_{error}$ in comparison with their real position in the three-dimensional volume (see FIG. 2 showing a model of the perspective projection in mammography). In Equation (3) this offset is computed. The "Distance to Detector" and the "Body Thickness" are DICOM values provided in the DICOM header of the mammography images. As the depth of a point A in the breast is not known, it is assumed that A is located on the center of the volume, at distance $d_{body}/2$ from the image plane.

$$\frac{d_{detector}}{d_{projection}} = \frac{d_{body}/2}{d_{error}} \Rightarrow d_{error} = d_{body}/2 \cdot \frac{d_{projection}}{d_{detector}} \Rightarrow d_{error} = d_{body}/2 \cdot \frac{d_A^{CC}}{d_{detector}} \quad (3)$$

The MR nipple-pectoral line $NP^{MR}$ should optimally represent the two projections in MG, the CC nipple-pectoral line $NP^{CC}$ and the $NP^{MLO}$ in the rotated MLO acquisition. A corresponding source or target line and, thus, the point $P^{MR}$ in the MR image are preferentially defined by the intersecting line of the sagittal and axial body plane that meet the frontal breast position, or the shortest line connecting the pectoral surface and the frontal breast position, wherein the line is located in the sagittal body plane that meets the frontal breast position.

For the sake of simplicity of the following description and without loss of generality it is assumed that in three-dimensional MR image the x-axis is orthogonal to the sagittal body plane, the y-axis is orthogonal to the coronal body plane and the z-axis is orthogonal to the axial plane. Preferred locations of the point $P^{MR}$ can then be defined as:

1. The point $P^{MR}$ on the pectoral surface with $P_x^{MR} = N_x^{MR}$, $P_z^{MR} = N_z^{MR}$. The line $NP^{MR}$ is therefore parallel to the y-axis and perpendicular coronal plane.
2. The point PMR on the pectoral surface with $P_z^{MR} = N_z^{MR}$ and $d_{NP}^{MR} = \min|N^{MR} - P^{MR}|$.
3. The point $P^{MR}$ on the pectoral surface with $P_x^{MR} = N_x^{MR}$ and $d_{NP}^{MR} = \min|N^{MR} - P^{MR}|$.
4. The point $P^{MR}$ on the pectoral surface with $d_{NP}^{MR} = \min_t|N^{MR} - P^{MR}|$, thus the three-dimensional minimum nipple-pectoral distance.

Figure 5:
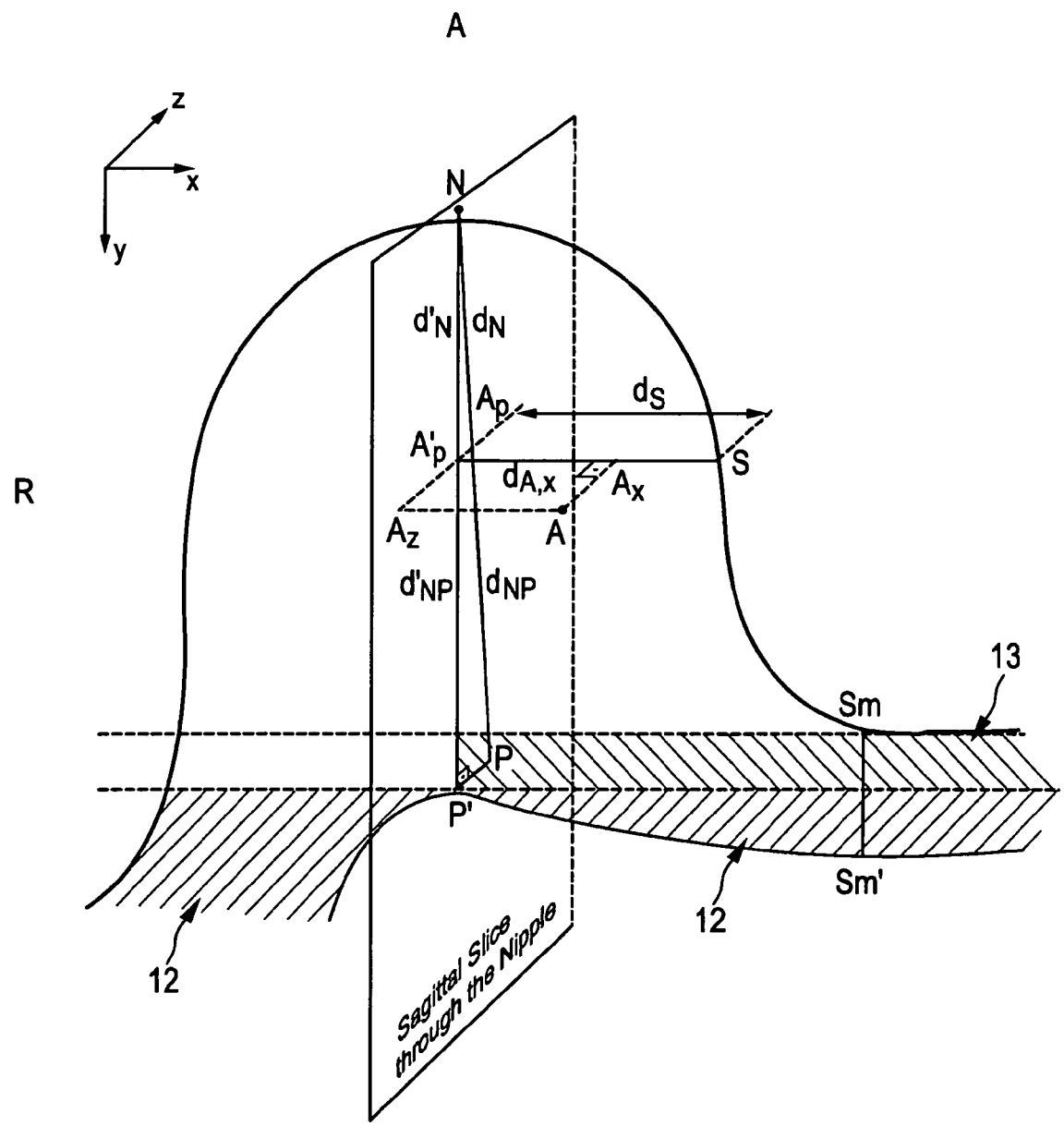
FIG. 5 illustrates schematically and exemplarily an MR scan in an axial orientation.

In this embodiment, option 3 is preferred, i.e. the line $NP^{MR}$ shown in FIG. 5. FIG. 5 illustrates an MR scan, axial orientation. For clarity reasons in FIG. 5 the superscript MR is omitted for all points and distances. It can be observed that P and P''' as well as $A_p$, $A'_p$, and $A_z$ are on the same sagittal slice, thus have the same x-coordinate.

The second region determination unit 4 is preferentially adapted to determine a y-coordinate of the second region in the MR image, wherein the y-axis of the orthogonal coordinate system of the three-dimensional image is orthogonal to the coronal body plane, depending on a first source ratio being determined by i) determining a first source line in the second two-dimensional projection image, which is perpendicular to the pectoral line and connects the pectoral line with the frontal breast position, ii) projecting the first region onto the first source line in the second two-dimensional projection image, thereby dividing the first source line into two first source sub-lines, and iii) determining the first source ratio as the ratio of the length of one of the first source sub-lines to the length of the entire first source line. In particular, the y-coordinate $A_y^{MR}$ of the point $A^{MR}$, i.e. of the second region, can be calculated based on the nipple-pectoral line being a source line, whereby only information from the MLO image is considered mainly because the pectoral muscle is frequently not depicted in CC views. The location $A_p$ is defined as the projection of point A onto the nipple-pectoral line, and the distances $d_A=|A-A_p|$ and $d_N=|N-A_p|$ are defined.

The ratio of the distance $d_N$ relative to the nipple-pectoral distance $d_{NP}$, i.e. a source ratio, is computed (FIG. 4) and assumed to be constant in both the MLO and MR image. Thus, the distance $d_N^{MR}$ in MR can be defined as a fraction of the nipple-pectoral distance $d_{NP}^{MR}$, as illustrated in FIG. 5 and computed with Equation (4)

$$d_N^{MR} = d_{NP}^{MR} \frac{d_N^{MLO}}{d_{NP}^{MLO}} \qquad (4)$$

Figure 4:
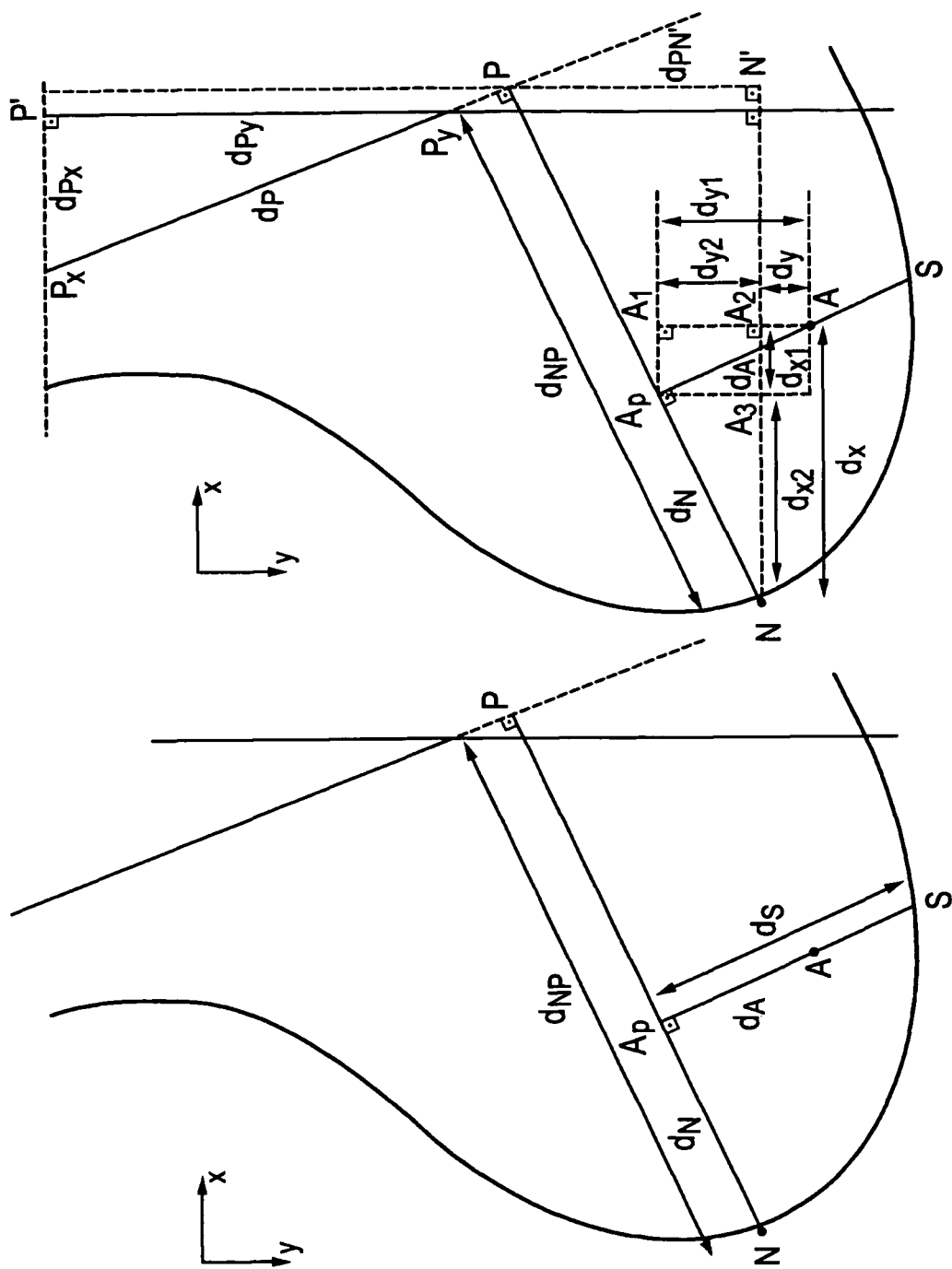
FIG. 4 illustrates schematically and exemplarily an MLO MG scan.

FIG. 4 illustrates an MLO MG scan. For clarity reasons the superscript MLO is omitted for all points and distances in FIG. 4.

As the triangles $\Delta NPP'$ and $\Delta NA_pA'_p$ in the MR image are similar triangles, the distance $d'_N{}^{MR}=|N-A'_p|$ can be expressed as (Eqn. (5))

$$d'_N{}^{MR} = \frac{d'_{NP}{}^{MR} \cdot d_N^{MR}}{d_{NP}^{MR}} \qquad (5)$$

The y-coordinate $A_y^{MR}$ of $A^{MR}$ can then be computed as (Eqn. (6))

$$A_y^{MR}=N_y^{MR}+d'_N{}^{MR} \qquad (6)$$

where $N^{MR}=(N_x^{MR},N_y^{MR},N_z^{MR})$ are the coordinates of the nipple in the MR image.

Figure 3:
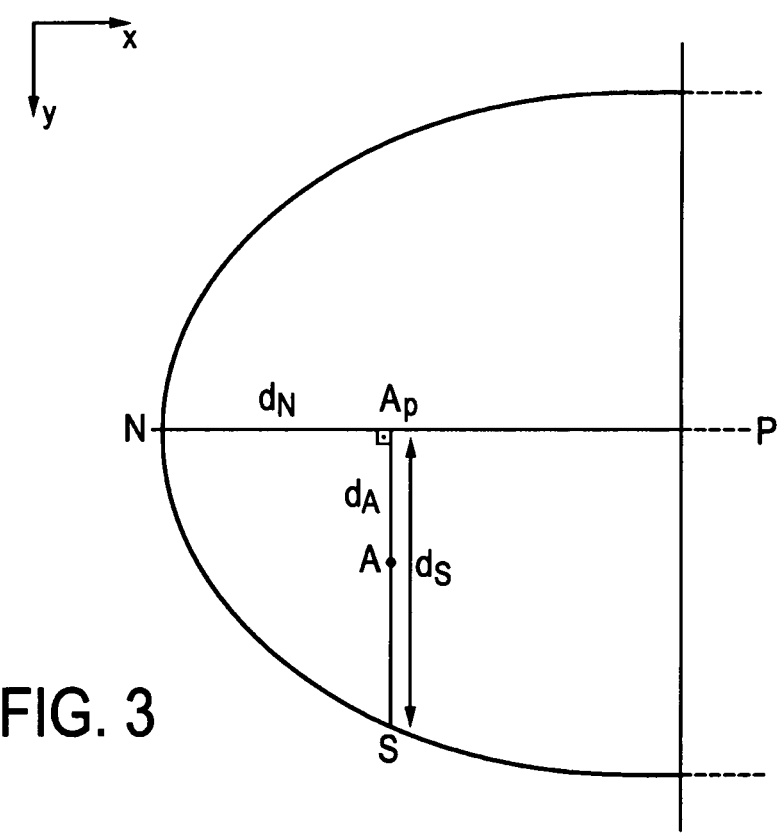
FIG. 3 illustrates schematically and exemplarily a CC MG scan.

The second region determination unit 4 is preferentially further adapted to determine an x-coordinate of the second region in the MR image, wherein the x-axis of the orthogonal coordinate system of the MR image is orthogonal to the sagittal body plane, depending on a second source ratio being determined by i) determining a second source line in the first two-dimensional projection image, which a) is perpendicular to and starts at a line, which is perpendicular to the pectoral line in the first two-dimensional projection image and connects the pectoral line with the frontal breast position, b) intersects the first region, and c) ends at the skin surface of the breast, and ii) determining the second source ratio as the ratio of the length of one of the second source sub-lines, in which the second source line is divided by the first region, to the length of the entire second source line. In particular, the computation of the x-coordinate $A_x^{MR}$ of $A^{MR}$ can be based on the same method of relative distances as used for the y-coordinate—but it uses the mediolateral distances to the skin surface. The distance $d_S$ can be defined as the distance between the projection of point A onto the nipple-pectoral line, i.e. a first source line, and the skin ($d_S=|S-A_p|$) along a second source line. At this point, only information from the CC image is needed. First, the ratio of the distance $d_A^{CC}$ to the skin distance $d_S^{CC}$ is computed (FIG. 3). FIG. 3 illustrates a CC MG scan. For clarity reasons the superscript CC is omitted for all points and distances in FIG. 3.

The distance $d_A^{CC}$ in the CC image corresponds to the distance $d_{A,x}^{MR}=|A_x-A'_p|$ in the MR image, which itself is a fraction of the MR skin distance $d_S^{MR}=|S-A'_p|$, since the CC acquisition is a projection of the volume on a plane with normal parallel to the z-axis (FIG. 5). Hence, the distance $d_{A,x}^{MR}$ can be expressed as (Eqn. (7))

$$d'_{A,x}{}^{MR} = \frac{d_S^{MR} \cdot (d_A^{CC} - d_{error})}{d_S^{CC}} \qquad (7)$$

which includes the above described a perspective projection correction. The x-coordinate $A_x^{MR}$ is thereafter calculated relatively to the x-coordinate $N_x^{MR}$ of the MR nipple position (Eqn. (8))

$$A_x^{MR}=N_x^{MR}+d_{A,x}{}^{MR} \qquad (8)$$

In a first area indicated in FIG. 5 by reference number 13, the distance $d_S^{MR}$ to the skin is difficult to be computed. To cope with this problem, the beginning of the plateau near the sternum is preferentially detected, defined by the point $S_m$. The skin distances are then preferentially calculated to the defined perpendicular line $S_mS'_m$. Moreover, in a second area indicated in FIG. 5 by reference number 12 the mapping should be considered as invalid, as the nipple distance exceeds the nipple-pectoral distance.

Figure 6:
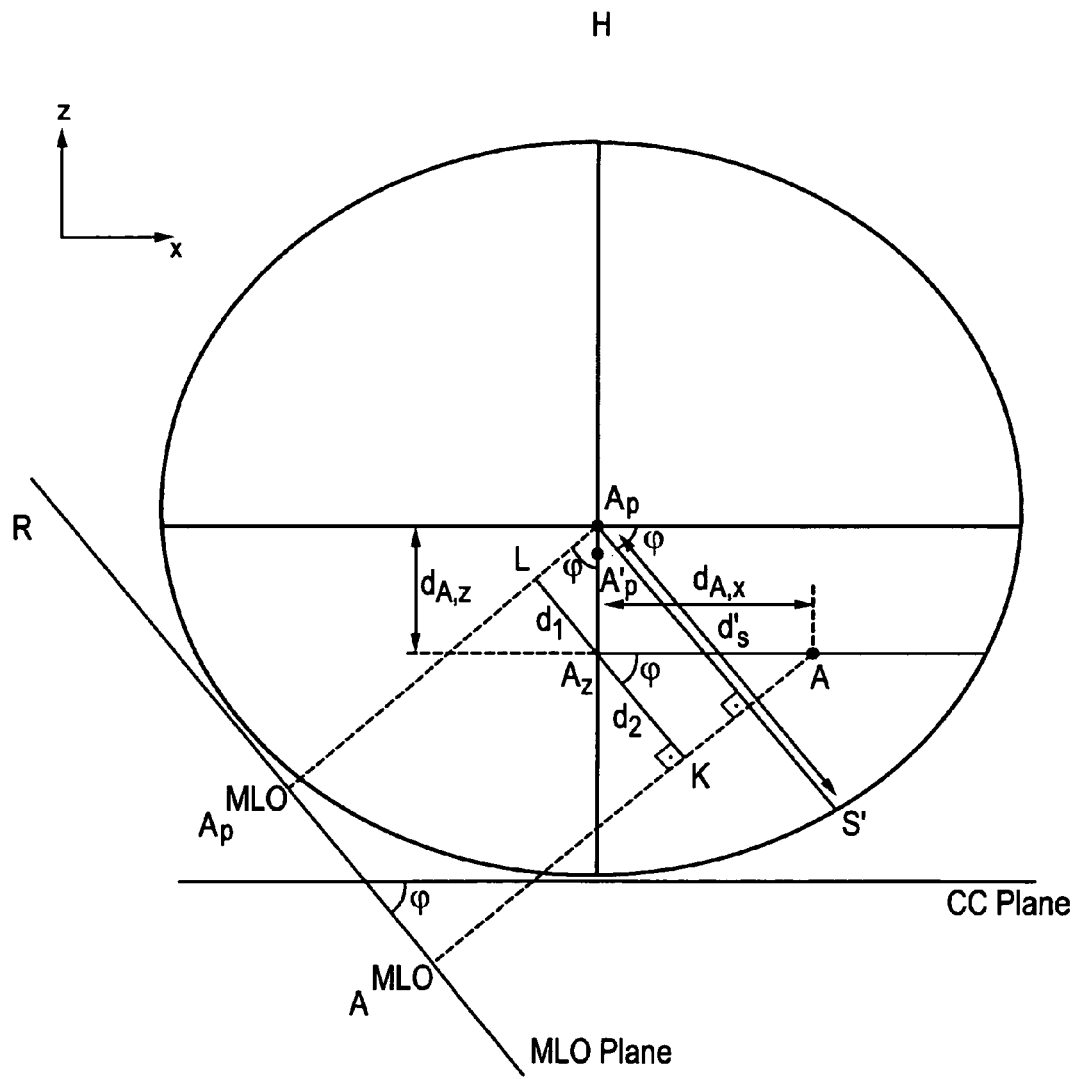
FIG. 6 illustrates schematically and exemplarily an MR scan in a coronal orientation.

The second region determination unit 4 can further be adapted to determine a z-coordinate of the second region in the three-dimensional image, wherein the z-axis of the orthogonal coordinate system of the three-dimensional image is orthogonal to the axial body plane, depending on a third source ratio being determined by i) determining a third source line in the second two-dimensional projection image, which is perpendicular to the first source line, intersects the first region and ends at the skin surface of the breast, and ii) determining the third source ratio as the ratio of the length of one of the third source sub-lines, in which the third source line is divided by the first region, to the length of the entire third source line. In particular, the computation of the z-coordinate in the MR volume can be based on the fraction $d_{RL}=|K-L|$ of the skin distance $d'_S{}^{MR}=|S'-A_p|$ (FIG. 6). FIG. 6 illustrates an MR scan, coronal orientation.

The distance $d'_S{}^{MR}$ is the inclined skin distance defined by the inclination $\phi$ of the MLO acquisition plane to the longitudinal axis (FIG. 6). The inclination value can be read from the DICOM of header of the image file. The point $A_p$ is the point on the nipple-pectoral line, as defined in FIG. 5. The distance $d_{KL}$ can again be defined relatively to $d'_S{}^{MR}$ $$d_{KL} = \frac{d'_S{}^{MR} \cdot (d_A^{MLO} - d_{error})}{d_S^{MLO}}$$

where the perspective projection error is already included.

In practice, it can be difficult to measure the skin distance $d_S^{MLO}$ at all possible positions in the breast. Under the assumption that the breast is a symmetric object with the nipple pectoral line being the symmetry axis and the compression force is nearly the same in both views, one may replace $d_S^{MLO}$ by $d_S^{CC}$. Thus, the above equation becomes (Eqn. (9))

$$d_{KL} = \frac{d_S'^{MR} \cdot (d_A^{MLO} - d_{error})}{d_S^{CC}} \qquad (9)$$

By defining the distances $d_1 = |A_z - K|$ and $d_2 = |A_z - L|$, the distance $d_{A,z} = |A_z - A_p|$ can be expressed as (Eqn. (10))

$$d_{A,x} = \frac{d_1}{\sin\varphi} = \frac{d_{KL} - d_2}{\sin\varphi} = \frac{d_{KL} - d_{A,x\,A,x}^{MR} \cdot \cos\varphi}{\sin\varphi} \qquad (10)$$

Where $d_{A,x}^{MR}$ is the distance in x-direction of A from the nipple as computed in Equation (7). Distances $d_{pp'} = |P-P'|$ and $d_{A_pA'_p} = |A_p - A'_p|$ can be defined. By using the properties for the similar triangles $\Delta NPP'$ and $\Delta NA_pA'_p$, these distances can be expressed as (Eqn. (11) and Eqn. (12))

$$d_{pp'} = (P_z^{MR} - N_z^{MR}) \qquad (11)$$

$$d_{A_pA'_p} = \frac{d_{pp'} \cdot d_N^{MR}}{d_{NP}^{MR}} \qquad (12)$$

The z-coordinate $A_z^{MR}$ of $A^{MR}$ can then be calculated relatively to the MR nipple coordinates (Eqn. 13):

$$A_z^{MR} = N_z^{MR} + d_{A_pA'_p} + d_{A,z} \qquad (13)$$

The transformation $A^{MR} = f_{MR}(A^{CC}, A^{MLO}, d^{(MLO,CC,MR)})$ of corresponding points in the CC($A^{CC}$) image and MLO ($A^{MLO}$) image to their corresponding point $A^{MR} = (A_x^{MR}, A_y^{MR}, A_z^{MR})$ in the MR image can therefore be summarized by (Eqn. (8), Eqn. (6), Eqn. (13))

$$A_x^{MR} = N_x^{MR} + d_{A,x}^{MR}$$

$$A_y^{MR} = N_y^{MR} + d_N'^{MR}$$

$$A_z^{MR} = N_z^{MR} + d_{A_pA'_p} + d_{A,z}.$$

The MR to MG mapping is basically the inverse method of the aforementioned MG to MR mapping. Hence, the equations from the MG to MR mapping can be inverted to compute the transformation from a point $A^{MR}$ in the MR image to its corresponding two-dimensional representations in the CC($A^{CC}$) and MLO($A^{MLO}$) image, respectively.

The second region determination unit 4 can be adapted to determine a y-coordinate of the second region in the CC mammography image, wherein the y-axis of the orthogonal coordinate system of the CC mammography image is orthogonal to the sagittal body plane, depending on a first source ratio being determined by i) determining a first source line in the MR image, which a) starts at a line, which is the projection of the line connecting the pectoral surface with the frontal breast position into the axial plane that meets the frontal breast position in the MR image, b) coincides with the intersection line of the axial plane that meets the frontal breast position and the coronal plane that contains the first region in the MR image, and c) ends at the skin surface of the breast, ii) projecting the first region onto the first source line in the MR image, thereby dividing the first source line into two first source sub-lines, and iii) determining the first source ratio as the ratio of the length of one of the first source sub-lines to the length of the entire first source line.

The second region determination unit 4 can further be adapted to determine an x-coordinate of the second region in the CC mammography image and the MLO mammography image, wherein the x-axes of the orthogonal coordinate systems of the CC mammography image and the MLO mammography image are orthogonal to the coronal body plane, depending on a second source ratio being determined by i) determining a second source line in the MR image, which connects the pectoral surface with the frontal breast position, and ii) determining the second source ratio as the ratio of the length of one of the second source sub-lines, in which the second source line is divided by the coronal plane, which contains the first region, to the length of the entire second source line.

Moreover, the second region determination unit 4 can be adapted to determine a y-coordinate of the second region in the MLO mammography image, wherein the y-axis of the orthogonal coordinate system of the MLO mammography image is orthogonal to the x-axis in the same image which is orthogonal to the coronal body plane, depending on a third source ratio being determined by i) determining a third source line in the three-dimensional image, which a) starts at a line, which connects the pectoral surface with the frontal breast position in the three-dimensional image, b) coincides with the intersection line of the coronal plane that contains the first region and the plane that meets the frontal breast position and has the same orientation as the projection plane of the MLO or ML in the three-dimensional image, and c) ends at the skin surface of the breast, ii) projecting the first region onto the third source line in the three-dimensional image, thereby dividing the third source line into two first source sub-lines, and iii) determining the third source ratio as the ratio of the length of one of the third source sub-lines to the length of the entire third source line.

In particular, for MR to CC mapping the y-coordinate $A_y^{CC}$ of the point $A^{CC}$ can be computed relatively to $d_S^{CC}$—the current distance to the skin. Therefore, equation (7) can be solved for $d_A^{CC}$, comprising also the error of the perspective projection as aforementioned $$d_A^{CC} = d_S^{CC} \frac{d_{A,x}^{MR}}{d_S^{MR}} + d_{error} \qquad (14)$$

The y-coordinate $A_y^{CC}$ is then computed relatively to $N^{CC} = (N_x^{CC}, N_y^{CC})$—the nipple coordinates in the CC image—as described in Equation (16).

For the x-coordinate $A_x^{CC}$ of $A^{CC}$, it is assumed that the distance $d_N$ to the nipple is the same in both the CC and the MLO image, i.e. $d_N^{CC} = d_N^{MLO}$. Therefore, $d_N^{CC}$ can be calculated relatively to the distance $d_{NP}^{MLO}$ in the MLO image (Equation (17)), such that computations in posterior, i.e., close to the pectoral line, can also be defined. Again, the x-coordinate $A_x^{CC}$ can be expressed relatively to $N^{CC}$ (Equation (15)).

The final transformation $A^{CC} = f_{CC}(A^{MR}, d^{(MLO,CC,MR)})$ of a point $A^{MR}$ in the MR image to its corresponding point $A^{CC} = (A_x^{CC}, A_y^{CC})$ in the CC image can then be written as (Eq. (15) and Eq. (16))

$$A_x^{CC} = \begin{cases} N_x^{CC} + d_N^{CC}, & MG \text{ laterality} = R \\ N_x^{CC} - d_N^{CC}, & MG \text{ laterality} = L \end{cases} \quad (15)$$

$$A_y^{CC} = \begin{cases} N_y^{CC} - d_A^{CC}, & A^{MR} \text{ lateral of the line } NP^{MR} \\ N_y^{CC} + d_A^{CC}, & A^{MR} \text{ medial of the line } NP^{MR}. \end{cases} \quad (16)$$

For MR to MLO mapping, to determine the coordinates of the point $A^{MLO}=(A_x^{MLO}, A_y^{MLO})$ in the MLO image, the distances $d_N^{MLO}$ and $d_A^{MLO}$ are preferentially used (FIG. 4). However these distances do not lay parallel to the image coordinate axes of the MR image like in the CC case. Their orthogonal x- and y-projections $d_{x1}=|A_p-A_1|$, $d_{y1}=|A-A_1|$, $d_{y2}=|A_3-N|$, and $d_{y2}=|A_2-A_1|$ are used to calculate the position of $A^{MLO}$ in relation to the nipple $N^{MLO}$. First the distance $d_N^{MLO}$ can be determined after inverting Equation (4) resulting in Equation (17)

$$d_N^{MLO} = d_{NP}^{MLO} \frac{d_N^{MR}}{d_{NP}^{MR}} \quad (17)$$

The distance $d_A^{MLO}$ is computed as a fraction of the skin distance $d_S^{MLO}$ (FIG. 4). This fraction is determined from the ratio of the distance $d_{KL}$ relatively to the inclined skin distance $d'_S^{MR}$. Given the point $A^{MR}=(A_x^{MR}, A_y^{MR}, A_z^{MR})$ and the nipple $N^{MR}=(N_x^{MR}, N_y^{MR}, N_z^{MR})$ in the MR image, the distance $d_{KL}$ can be calculated by rewriting Equation (10)

$$d_{KL} = d_1 + d_2 = d_{A,z} \cdot \sin\phi + d_{A,z} \cdot \cos\phi. \quad (18)$$

By setting $d_{A,x}=|N_x^{MR}-A_x^{MR}|$ and $d_{A,z}=|N_z^{MR}-A_z^{MR}|+d_{A_pA'_p}$ with $d_{A_pA'_p}$ from Equation (12) and using Equation (9), the distance $d_A^{MLO}$ can be computed as (Equation (19))

$$d_A^{MLO} = d_S^{CC} \frac{d_{KL}}{d'_S^{MR}} + d_{error} \quad (19)$$

Subsequently, the MLO distances $d_{x1}$ and $d_{y1}$ based on the similar triangles $\Delta AA_pA_1$ and $\Delta PP_xP'$ the distances $d_{x2}$ and $d_{y2}$ based on the similar triangles $\Delta NA_pA_3$ and $\Delta NPN'$ are computed (Eqns. (20)-(23)). For this, the points $P_x$ and $P_y$ are defined as the intersections of the pectoral line with the image borders, P as the orthogonal projection of the nipple $N^{MLO}$ onto the pectoral line, and the line P'N' as parallel to the image y axis $$d_{y1} = d_A^{MLO} \frac{d_{p_y}}{d_p} \quad (20)$$

$$d_{x1} = \sqrt{(d_A^{MLO})^2 - (d_{y1})^2} \quad (21)$$

$$d_{y2} = \left( d_N^{MLO} \frac{d_{PN}}{d_{NP}^{MLO}} \right) \quad (22)$$

$$d_{x2} = \sqrt{(d_N^{MLO})^2 - (d_{y2})^2} \quad (23)$$

Finally, the transformation $A^{MLO}=f_{MLO}(A^{MR}, d^{(MLO,CC,MR)})$ of a point $A^{MR}$ in the MR image to its corresponding point $A^{MLO}=(A_x^{MLO}, A_y^{MLO})$ in the MLO image can be written as (Eq. (24) and Eq. (25))

$$A_x^{MLO} = \begin{cases} N_x^{MLO} + (d_{x1}+d_{x2}), & MG \text{ laterality} = R \\ N_x^{MLO} - (d_{x1}+d_{x2}), & MG \text{ laterality} = L \end{cases} \quad (24)$$

$$A_y^{MLO} = \begin{cases} N_y^{MLO} - (d_{y1}+d_{y2}), & A^{MR} \text{ cranial of } A_p^{MR} \\ N_y^{MLO} + (d_{y1}-d_{y2}), & A^{MR} \text{ caudal of } A_p^{MR} \end{cases} \quad (25)$$

In the above equations instead of the projection error $d_{error}$ a modified projection error can be used. For example, the projection error can be modified by multiplying the projection error with a factor of, for example, 2.0. The factor can be determined empirically such that the quality of determining the second region can be improved.

The image processing device 1 further comprises a display 10 for displaying the first region in the first image data set, i.e., in this embodiment, in either the MR image or the CC and MLO mammography images, and the second region in the second image date set, i.e., in this embodiment, in the other of the MR image and the CC and MLO mammography images.

The image processing device 1 further comprises a tool providing unit 5 for providing a tool for being used in the first image data set and in the second image data set, wherein the display 10 is adapted to show the tool at the first region in the first image data set and at the second region in the second image data set. For example, a tool can be provided at the first region in the MR image and, preferentially simultaneously, at the corresponding second regions in the CC and MLO mammography images. The tool providing unit 5 is adapted to provide, for example, a local digital magnifier, a cross-hair, a peak-hole view, et cetera as a tool for being used in both image data sets. Preferentially, the tools are shown in realtime at the respective positions. The display 10 can comprise several inspectors for showing the different images, wherein the respective tool can be shown in all inspectors in realtime.

The first region determination unit can be adapted to provide a graphical annotation like a point, a two-dimensional contour or a three-dimensional volume as the first region in the first image data set. The second region determination unit can then determine a second region, which corresponds to the first region, wherein the display can be adapted to show a graphical annotation, which corresponds to the graphical annotation in the first image data set, at the determined second region in the second image data set. In an embodiment, the graphical annotation can be drawn by the user with a suitable drawing or segmentation tool provided by the first region determination unit. For example, a corresponding graphical user interface can be used together with the input unit 11. The graphical annotation can also be drawn by, for example, a full-automatic algorithm like a CAD algorithm provided by the first region determination unit.

The image processing device 1 further comprises an uncertainty determination unit 6 for determining an uncertainty of determining the second region in the second image data set, wherein the display 10 is adapted to indicate the uncertainty in the second image. For example, the mean and standard deviation of the error of determining the region can be estimated based on a data base of image data sets with ground truth. The estimated error statistics can then be visualized as a graphical object like a circle, an ellipse, a sphere or an ellipsoid, reflecting an estimated threshold confidence interval such that the user can limit his/her local search for the true corresponding anatomical structure, which corresponds to the first region in the first image data set, to a small neighborhood around the computed second region in the second image data set. In an embodiment, the graphical object reflects an estimated 95% confidence interval. Since, in this case, the first region in the first image data set can be regarded as being imaged to a graphical object reflecting an estimated threshold confidence interval, which is based on an error statistics analysis, the mapping can be regarded as a mapping of the first region in the first image data set to a probability distribution in the second image data set.

The image processing device 1 further comprises a finding providing unit 7 for providing findings in the first image data set and the second image data set, wherein the first region determination unit 3 is adapted to determine the region of a first finding in the first image data set as the first region. The image processing device 1 further comprises a grouping unit 8 for grouping the first finding and a second finding in the second image data set into a group of findings, if the distance between the position of the second finding in the second image data set and the position of the second region is smaller than a predefined threshold. The predefined threshold can be predefined by using calibration or training image data sets having findings, of which it is known, whether the findings denote the same anatomical structure or not. The findings can be annotations, which may have been manually drawn by a user and/or which may have been generated by an algorithm like a CAD algorithm.

The image processing device 1 further comprises a group classification unit 9 for classifying a group of findings based on features of the findings of the group and on predefined group classification rules.

The image processing device can therefore be adapted to full-automatically link findings in the image data sets. The spatial location of a finding, for example, of a tumor, may be described with a graphical annotation like a point, a two-dimensional region or a three-dimensional region. The annotation may be full-automatically computed by the finding providing unit 7, for example, by a CAD algorithm, or manually defined by an input from the user. The image processing device 1 can be adapted to link two or more findings by computing their spatial distance, for example, by mapping a point annotation from one image data set to another image data set and by computing the distance between the mapped point and the annotation in the second image data set. If the distance is less than a predefined threshold, it is likely that both annotations mark the same finding. For a two-dimensional annotation or a three-dimensional annotation, the distance to a representative point like the center of gravity or one of the points of the contour or volume of the breast may be computed.

Finding candidates may be full-automatically generated in the image data sets of the same breast, for example, by a CAD algorithm. The image processing device can be used to full-automatically link the finding candidates from all image data sets, in order to combine the corresponding image-based features for a joined assessment, for example, by a statistical classification algorithm. Suitable features determined from each image data set are, for example, the shape of the finding, the characteristic of the finding margin or other features describing the local tissue morphology which potentially give evidence of, for example, malignant disorders, but are perhaps differently distinctive in each view. This classification of a group of findings based on features of the findings, i.e. a joined feature assessment, can improve the classification performance of CAD-algorithms, but also supports human readers in the clinical decision making process.

If a user draws an annotation in one image data set, i.e. if a first region is determined in a first image, the image processing device can determine whether one or several other annotations drawn in one or more other images of the other image data set are close and likely to refer to the same tissue structure. If this is the case, the image processing device may ask the user, whether this correspondence shall be registered for later reporting. This or a similar workflow is likely to improve the reporting process in terms of speed and safety.

Figure 7:
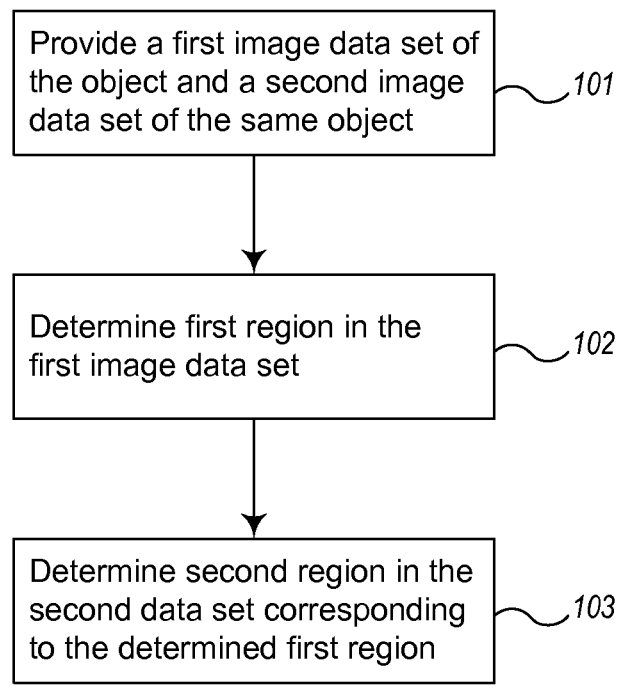
FIG. 7 shows a flowchart exemplarily illustrating an embodiment of an image processing method for finding corresponding regions in two image data sets of an object.

In the following, an embodiment of an image processing method for finding corresponding regions in two image data sets of an object will exemplarily be described with reference to a flowchart shown in FIG. 7.

In step 101, the image providing unit provides a first image data set of the object and a second image data set of the same object. In step 102, a first region is determined in the first image data set by the first region determination unit. In step 103, a second region, which corresponds to the first region in the first image data set, is determined in the second image data set by the second region determination unit 4. In particular, a source line is determined in the first image data set depending on reference regions detectable in the first image data set and in the second image data set. The first region is projected onto the source line in the first image data set, thereby dividing the source line into two source sub-lines. A source ratio is determined as the ratio of the length of one of the source sub-lines to the length of the entire source line. A target line is determined, which corresponds to the source line, in the second image data set depending on the reference regions detectable in the first image data set and in the second image data set, and the second region is determined in the second image data set such that a projection of the second region onto the target line divides the target line into two target sub-lines, such that the ratio of the length of one of the target sub-lines to the entire length of the target line is similar to the source ratio.

The image processing device and method are preferentially adapted to transfer coordinates between three-dimensional and/or two-dimensional images each depicting the same object under a potentially different compression setting. For instance, the image processing device and method can be used to map coordinates between two three-dimensional MRI volumes that have been acquired before and after repositioning of the patient and light compression of the breast as they are frequently acquired, e.g. for therapy monitoring, or between a three-dimensional MRI volume, which can be regarded as one of first and a second image data sets, and two mammographic X-ray projection images, which can be regarded as the other of the first and second image data set, where the latter are usually acquired while the breast is heavily compressed between two plates.

In an embodiment, the working hypothesis is that the breast compression has a linear effect on the breast tissue such that compression results to a linear scaling of distances within the breast. For instance, a point which is located halfway on the shortest line between the nipple and the pectoral muscle of an uncompressed breast can be assumed to be still located halfway on this line after compression of the breast between two parallel plates. If the end points of the line can also be identified in another image of the same breast, which has been potentially acquired under a different compression setting (e.g. different orientation of the compression plates), it can be assumed that the corresponding point is again located halfway on this line. This assumption should in particular approximately hold if the object (breast) is compressed between two parallel plates and the considered line is measured parallel to the compression force. Therefore, coordinates can be mapped between two images showing the same object under different compression by measuring at least three normalized distances to suitable landmarks, ideally in a plane parallel to the compression force. Since mammographic X-ray images are projection images that have no depth information, at least two mammograms with a certain angular separation are combined to estimate a three-dimensional coordinate, e.g. in a three-dimensional MRI volume.

The described working hypothesis is obviously a simplification of the true biomechanical properties of the breast, which is a heterogeneous mixture of different tissue types. It nevertheless allows developing without explicit modelling of the biomechanical properties a full-automatic method that allow for realtime mapping of coordinates with a precision that is sufficient for a number of clinical applications.

The image processing device and method preferentially realize a bijective point to point translation of position from a three-dimensional image, e.g. a MRI image, to two disparate two-dimensional projection images such as MLO and CC mammograms, and vice versa. The problem of the missing depth information in a single two-dimensional projection is overcome by utilizing two disparate views of the same breast that are commonly acquired in mammography. The image processing device and method do preferentially not require any explicit biomechanical modeling or other compression/decompression models of the breast to compensate for breast deformations caused by intended compression or patient placement. It does also preferentially not depend on any intensity-based registration steps and therewith on a detailed segmentation of the tissue structures in the breast and simulation of X-ray projection images. The method can however also be used to transfer coordinates between two three-dimensional image volumes acquired with the same or two different modalities.

The image processing device and method are preferentially based on the fundamental idea and assumption that, although distances between landmarks in the breast change during compression, the ratio between the distances remains approximately the same, in particular in the plane orthogonal to the vector of the compression force. For instance, assume a point A which is located half way on the shortest line connecting the nipple N with the pectoral muscle P. If the breast is compressed between two plates which are parallel to this line, the cross-section of the breast expands and so do the length $d_{PN}$ of the nipple to pectoral line NP and the distance $d_{AN}$ between A and the nipple N. It can approximately be assumed that $d_{PN}$ and $d_{AN}$ change by the same factor which is canceled out if only the ratio of both measurements is considered. Although this assumption is a strong simplification of the of real biomechanical behavior of the breast, which consists of a heterogeneous composition of tissue that irregularly expands under compression, it enables to approximate corresponding positions in MRI and MG images in realtime, with a for many clinical tasks reasonable precision, with very low computational demands and without any user-input except an initial starting position in one modality.

The image processing device and method are preferentially adapted to perform the mapping in both directions, i.e., if two image data sets are provided, a region determined in one of these image data sets can be mapped to a corresponding region in the other of the image data sets and vice versa. For example, the image processing device and method are preferentially adapted to determine corresponding second regions in mammography projection images, after a first region has been determined in a three-dimensional MR image, and to determine a second region in the three-dimensional MR image, after corresponding first regions have been determined in the mammography projection images.

Although in above described embodiments an image data set comprises a CC mammography image and an MLO mammography image, an image data set can also comprise other two-dimensional projection images, which correspond to different projection directions. For example, an image data set can comprise CC and ML mammography images, wherein in these mammography images first regions can be determined and wherein in another image data set comprising a MR image a corresponding second region can be determined or vice versa.

Although in the above described embodiments corresponding regions are determined in two image data sets, the image processing device and method can also be adapted to determine corresponding regions in more than two image data sets. Generally, if in a first image data set a first region has been determined, in other image data sets of the same object corresponding second regions can be determined.

Although in the above described embodiments the object is a breast, in other embodiments the object can also be another subject like another part of a human being or of an animal or a technical subject.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Calculations, like the determination of the second region, the grouping of findings, the classification of groups, et cetera performed by one or several units or devices can be performed by any other number of units or devices. The calculations and/or the control of the image processing device in accordance with the image processing method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to an image processing device for finding corresponding first and second regions in two image data sets of an object. In a first image data set a source line and in a second image data set a corresponding target line are determined depending on reference regions detectable in both image data sets. A first region in the first image data set is projected onto the source line, thereby dividing the source line into two source sub-lines and defining a source ratio as the ratio of the length of one of the source sub-lines to the length of the entire source line. A second region in the second image data set is then determined such that a projection of the second region onto the target line leads to a corresponding target ratio which is similar to the source ratio.

All of the above U.S. patents, U.S. patent application publications, U.S. patent applications, foreign patents, foreign patent applications and non-patent publications listed in the Application Data Sheet, including PCT Application No. PCT/EP2011/053134 entitled "IMAGE PROCESSING DEVICE FOR FINDING CORRESPONDING REGIONS IN TWO IMAGE DATA SETS OF AN OBJECT," filed Mar. 2, 2011 and published as WO 2012/116746 A1 on Sep. 7, 2012, are incorporated herein by reference, in their entirety.

The invention claimed is:

1. An image processing device for finding corresponding regions in two image data sets of a breast, the image processing device comprising:
    an image providing unit configured to provide a first image data set of the breast and a second image data set of the same breast, wherein one of the first image data set and the second image data set comprises a three-dimensional image and the other of the first image data set and the second image data set comprises at least two two-dimensional images, wherein the at least two two-dimensional images are projection images which correspond to different projection directions;
    a first region determination unit configured to determine a first region in the first image data set;
    a second region determination unit configured to determine a second region in the second image data set, which corresponds to the first region in the first image data set, wherein the second region determination unit is configured to:
    determine a source line in the first image data set depending on reference regions detectable in the first image data set and in the second image data set, wherein the reference regions are the pectoral line or pectoral surface, the skin line or skin surface of the breast and/or the frontal breast position, wherein the frontal breast position is defined by one of the following options a) the nipple position, b) the cutting point of the skin line or skin surface and the line that is perpendicular to the pectoral line or pectoral surface and crosses the center of mass of the breast, and c) the point on the skin line or skin surface having the largest perpendicular distance to the pectoral line or pectoral surface;
    project the first region onto the source line in the first image data set, thereby dividing the source line into two source sub-lines;
    determine a source ratio as the ratio of the length of one of the source sub-lines to the length of the entire source line;
    determine a target line, which corresponds to the source line, in the second image data set depending on the reference regions detectable in the first image data set and in the second image data set; and
    determine the second region in the second image data set such that a projection of the second region onto the target line divides the target line into two target sub-lines such that the ratio of the length of one of the target sub-lines to the entire length of the target line is similar to the source ratio; and
    wherein a source line and/or a target line is determined in at least one of the following ways:
        i) in the projection images as a line connecting the pectoral line with the frontal breast position,
        ii) in the projection images as a line connecting a border of the projection image with the frontal breast position, and/or
        iii) in the three-dimensional image as a line connecting the pectoral surface with the frontal breast position or as an intersecting line of the sagittal and axial body plane that meets the frontal breast position.

2. The image processing device as defined in claim 1, wherein the second region determination unit is configured to:
    determine corresponding source lines and source ratios in the at least two two-dimensional images; and
    average the corresponding source ratios for generating at least one average source ratio used to determine the second region.

3. The image processing device as defined in claim 1, wherein the second region determination unit is configured to determine the source line depending on the reference regions and the first region in the first image.

4. The image processing device as defined in claim 1, wherein the source line and the target line are perpendicular to the pectoral line or pectoral surface, respectively.

5. The image processing device as defined in claim 1, wherein at least one of the source line and the target line in the three-dimensional image is defined by a shortest line connecting the pectoral surface and the frontal breast position, wherein the shortest line is located in the sagittal body plane that meets the frontal breast position.

6. The image processing device as defined in claim 1, wherein the second region determination unit is configured to:
    determine for different dimensions of the first region different linear independent source lines depending on the reference regions;
    project the first region onto the different source lines, thereby dividing each source line into two source sub-lines;
    determine different source ratios of the length of one of the respective source sub-lines to the length of the entire respective source line for each source line;
    determine different target lines, which correspond to the different source lines, in the second image data set depending on the reference regions detectable in the first image data set and in the second image data set; and
    determine the second region in the second image data set such that, for each target line, a projection of the second region onto the respective target line divides the respective target line into two respective target sub-lines such that the ratio of the length of one of the respective target sub-lines to the entire length of the respective target line is similar to the respective source ratio.

7. The image processing device as defined in claim 6, wherein at least one source line is determined depending on the reference regions and the first region and wherein at least one corresponding target line is determined depending on the reference regions and a source ratio.

8. The image processing device as defined in claim 7 wherein a first source line connects the frontal breast position and the pectoral line or surface in the first image data set, wherein a second source line is perpendicular to the first source line, traverses the first region and ends at the skin surface of the breast in the first image data set, wherein a first target line, which corresponds to the first source line, connects the frontal breast position and the pectoral line or pectoral surface in the second image data set, and wherein a second target line, which corresponds to the second source line, is perpendicular to the first target line and divides the first target line into two target sub-regions such that the ratio of the length of one of the target sub-regions of the first target line to the length of the entire first target line is similar to the source ratio of the first source line.

9. The image processing device as defined in claim 1, wherein the first image data set comprises a first two-dimensional projection image of the breast being a craniocaudal (CC) image and a second two-dimensional projection image of the breast being a mediolateral oblique (MLO) image or a mediolateral (ML) image, wherein the second image data set comprises a three-dimensional image of the breast and wherein the second region determination unit is configured to:
  determine a y-coordinate of the second region in the three-dimensional image, wherein the y-axis of the orthogonal coordinate system of the three-dimensional image is orthogonal to the coronal body plane, depending on a first source ratio being determined by:
  determining a first source line in the second two-dimensional projection image, which is perpendicular to the pectoral line and connects the pectoral line with the frontal breast position;
  projecting the first region onto the first source line in the second two-dimensional projection image, thereby dividing the first source line into two first source sub-lines; and
  determining the first source ratio as the ratio of the length of one of the first source sub-lines to the length of the entire first source line;
  determine an x-coordinate of the second region in the three-dimensional image, wherein the x-axis of the orthogonal coordinate system of the three-dimensional image is orthogonal to the sagittal body plane, depending on a second source ratio being determined by: determining a second source line in the first two-dimensional projection image, which
    a) is perpendicular to and starts at a line, which is perpendicular to the pectoral line in the first two-dimensional projection image and connects the pectoral line with the frontal breast position,
    b) intersects the first region, and
    c) ends at the skin surface of the breast;
  determining the second source ratio as the ratio of the length of one of the second source sub-lines, in which the second source line is divided by the first region, to the length of the entire second source line; and
  determine a z-coordinate of the second region in the three-dimensional image, wherein the z-axis of the orthogonal coordinate system of the three-dimensional image is orthogonal to the axial body plane, depending on a third source ratio being determined by:
  determining a third source line in the second two-dimensional projection image, which is perpendicular to the first source line, intersects the first region and ends at the skin surface of the breast; and
  determining the third source ratio as the ratio of the length of one of the third source sub-lines, in which the third source line is divided by the first region, to the length of the entire third source line.

10. The image processing device as defined in claim 9, wherein the second region determination unit is configured to approximate the third source ratio as the ratio of the length of one of the third source sub-lines, in which the third source line is divided by the first region, to the length of the entire third source line.

11. The image processing device as defined in claim 1, wherein the first image data set comprises a three-dimensional image of the breast and the second image data set comprises a first two-dimensional projection image of the breast being a craniocaudal (CC) image and a second two-dimensional projection image of the breast being a mediolateral oblique (MLO) image or a mediolateral (ML) image of the breast, wherein the second region determination unit is configured to:
  determine a y-coordinate of the second region in the first two-dimensional projection image, wherein the y-axis of the orthogonal coordinate system of the first two-dimensional projection image is orthogonal to the sagittal body plane, depending on a first source ratio being determined by:
  determining a first source line in the three-dimensional image, which
    a) starts at a line, which is the projection of the line connecting the pectoral surface with the frontal breast position into the axial plane that meets the frontal breast position in the three-dimensional image,
    b) coincides with the intersection line of the axial plane that meets the frontal breast position and the coronal plane that contains the first region in the three-dimensional image, and
    c) ends at the skin surface of the breast;
  projecting the first region onto the first source line in the three-dimensional image, thereby dividing the first source line into two first source sub-lines; and
  determining the first source ratio as the ratio of the length of one of the first source sub-lines to the length of the entire first source line;
  determine a x-coordinate of the second region in the first two-dimensional projection image and in the second two-dimensional projection image, wherein the x-axes of the orthogonal coordinate systems of the first two-dimensional projection image and the second two-dimensional projection image are orthogonal to the coronal body plane, depending on a second source ratio being determined by:
  determining a second source line in the three-dimensional image, which connects the pectoral surface with the frontal breast position; and
  determining the second source ratio as the ratio of the length of one of the second source sub-lines, in which the second source line is divided by the coronal plane, which contains the first region, to the length of the entire second source line; and
  determine a y-coordinate of the second region in the second two-dimensional projection image, wherein the y-axis of the orthogonal coordinate system of the second two-dimensional projection image is orthogonal to the x-axis in the same image which is orthogonal to the coronal body plane, depending on a third source ratio being determined by:
  determining a third source line in the three-dimensional image, which
    a) starts at a line, which connects the pectoral surface with the frontal breast position in the three-dimensional image,
    b) coincides with the intersection line of the coronal plane that contains the first region and the plane that meets the frontal breast position and has the same orientation as the projection plane of the MLO or ML in the three-dimensional image, and
    c) ends at the skin surface of the breast;
  projecting the first region onto the third source line in the three-dimensional image, thereby dividing the third source line into two first source sub-lines; and
  determining the third source ratio as the ratio of the length of one of the third source sub-lines to the length of the entire third source line.

12. The image processing device as defined in claim 1, wherein at least one source ratio is corrected for a projection error.

13. The image processing device as defined in claim 1, wherein the image processing device further comprises a display configured to display the first region in the first image data set and the second region in the second image data set.

14. The image processing device as defined in claim 13, wherein the image processing device further comprises a tool providing unit configured to provide a tool for being used in the first image data set and in the second image data set and wherein the display is configured to show the tool at the first region in the first image data set and at the second region in the second image data set.

15. The image processing device as defined in claim 13, wherein the image processing device further comprises an uncertainty determination unit configured to determine an uncertainty of determining the second region in the second image data set and wherein the display is configured to indicate the uncertainty in the second image.

16. The image processing device as defined in claim 13, wherein the image processing device comprises a finding providing unit configured to provide findings in the first image data set and the second image data set, wherein the first region determination unit is configured to determine the region of a first finding in the first image data set as the first region, wherein the image processing device further comprises a grouping unit configured to group the first finding and a second finding in the second image data set into a group of findings, if the distance between the position of the second finding in the second image data set and the position of the second region is smaller than a predefined threshold.

17. The image processing device as defined in claim 16, wherein the image processing device further comprises a group classification unit configured to classify a group of findings based on features of the findings of the group and on predefined group classification rules.

18. An image processing method for finding corresponding regions in two image data sets of a breast, the image processing method comprising:
   providing a first image data set of the breast and a second image data set of the same breast by an image providing unit, wherein one of the first image data set and the second image data set comprises a three-dimensional image and the other of the first image data set and the second image data set comprises at least two two-dimensional images, wherein the at least two two-dimensional images are projection images which correspond to different projection directions;
   determining a first region in the first image data set by a first region determination unit;
   determining a second region, which corresponds to the first region in the first image data set, in the second image data set by a second region determination unit, wherein the determination includes:
   determining a source line in the first image data set depending on reference regions detectable in the first image data set and in the second image data set, wherein the reference regions are the pectoral line or pectoral surface, the skin line or skin surface of the breast and/or the frontal breast position, wherein the frontal breast position is defined by one of the following options a) the nipple position, b) the cutting point of the skin line or skin surface and the line that is perpendicular to the pectoral line or pectoral surface and crosses the center of mass of the breast, and c) the point on the skin line or skin surface having the largest perpendicular distance to the pectoral line or pectoral surface;
   projecting the first region onto the source line in the first image data set, thereby dividing the source line into two source sub-lines;
   determining a source ratio as the ratio of the length of one of the source sub-lines to the length of the entire source line;
   determining a target line, which corresponds to the source line, in the second image data set depending on the reference regions detectable in the first image data set and in the second image data set and
   determining the second region in the second image data set such that a projection of the second region onto the target line divides the target line into two target sub-lines such that the ratio of the length of one of the target sub-lines to the entire length of the target line is similar to the source ratio;
   wherein a source line and/or a target line is determined in at least one of the following ways:
     i) in the projection images as a line connecting the pectoral line with the frontal breast position,
     ii) in the projection images as a line connecting a border of the projection image with the frontal breast position, and/or
     iii) in the three-dimensional image as a line connecting the pectoral surface with the frontal breast position or as an intersecting line of the sagittal and axial body plane that meets the frontal breast position.

19. A non-transitory storage medium containing program code for controlling a computer that controls an image processing apparatus to find corresponding regions in two image data sets of a breast, by performing a method comprising:
   providing a first image data set of the breast and a second image data set of the same breast by an image, providing unit, wherein one of the first image, data set and the second image data set comprises a three-dimensional image and the other of the first image data set and the second image data set comprises at least two two-dimensional images, wherein the at least two two-dimensional images are projection images which correspond to different projection directions;
   determining a first region in the first image data set by a first region determination unit;
   determining a second region, which corresponds to the first region in the first image data set, in the second image data set by a second region determination unit, wherein the determination includes:
   determining a source line in the first image data set depending on reference regions detectable in the first image data set and in the second image data set, wherein the reference regions are the pectoral line or pectoral surface, the skin line or skin surface of the breast and/or the frontal breast position, wherein the frontal breast position is defined fay one of the following options a) the nipple position, b) the cutting point of the skin line or skin surface and the line that is perpendicular to the pectoral line or pectoral surface and crosses the center of mass of the breast, and c) the point on the skin line or skin surface having the largest perpendicular distance to the pectoral line or pectoral surface;
   projecting the first region onto the source in the first image data set, thereby dividing the source line into two source sub-lines;
   determining a source ratio as the ratio of the length of one of the source sub-lines to the length of the entire source line;
   determining a target line, which corresponds to the source line, in the second image data set depending on the reference regions detectable in the first image data set and in the second image data set and
   determining the second region in the second image data set such that a projection of the second region onto the target line divides the target line into two target sublines such that the ratio of the length of one of the target sub-lines to the entire length of the target line is similar[1] to the source ratio;
wherein a source line and/or a target line is determined in at least one of the following ways:
i] in the projection mages as a line connecting the pectoral line with the frontal breast position,
ii) in the projection images as a line connecting a border of the projection image with the frontal breast position, and/or
iii) in the three-dimensional image as a line connecting the pectoral surface with the frontal breast position or as an intersecting line of the sagittal and axial body plane that meets the frontal breast position.

\* \* \* \* \*